United States Patent [19]
Batson et al.

[11] Patent Number: 4,877,391
[45] Date of Patent: Oct. 31, 1989

[54] APPARATUS FOR SCORING RIGID PLASTIC SHEET MATERIAL

[75] Inventors: Edward E. Batson, Mesa; John H. Kurz, Scottsdale, both of Ariz.

[73] Assignee: WMF Container Corporation, Phoenix, Ariz.

[21] Appl. No.: 233,583

[22] Filed: Aug. 18, 1988

Related U.S. Application Data

[60] Division of Ser. No. 895,206, Aug. 11, 1986, Pat. No. 4,818,461, which is a continuation-in-part of Ser. No. 774,225, Sep. 9, 1985, abandoned.

[51] Int. Cl.$^4$ .............................................. B29C 43/40
[52] U.S. Cl. .................................... 425/289; 220/90.4; 220/270; 264/156; 425/291; 425/398
[58] Field of Search ................................ 425/289-293, 425/336, 398, 399, 298; 264/153-156, 163, 293, 313, 320, 322, 325, DIG. 66; 220/90.4, 270

[56] References Cited
U.S. PATENT DOCUMENTS

| | | | |
|---|---|---|---|
| 2,351,475 | 6/1944 | Berger | 264/320 X |
| 2,416,451 | 2/1947 | Magnus | 264/DIG. 66 |
| 3,502,761 | 3/1970 | Dimitracopoulos | 264/293 |
| 3,572,579 | 3/1971 | Mueller et al. | 220/270 X |
| 4,074,414 | 2/1978 | Anderka et al. | 264/322 X |
| 4,302,415 | 11/1981 | Lake | 425/298 X |
| 4,409,178 | 10/1983 | Ward | 425/298 X |
| 4,415,515 | 11/1983 | Rosenberg | 264/71 X |
| 4,518,096 | 5/1985 | Winstead | 220/90.4 X |
| 4,555,378 | 11/1985 | Martin et al. | 425/398 X |

Primary Examiner—Richard L. Chiesa
Attorney, Agent, or Firm—Paul R. Wylie

[57] ABSTRACT

An apparatus for forming frangible score lines in rigid plastic sheet material. The apparatus utilizes a flat surface having a serrated edge having points and notches. The rigid plastic sheet material is laid on the flat surface. A scoring means is positioned to strike downwardly on the sheet material whereby the points of the serrated edge of the flat surface will extend into the sheet material a distance further than the notches of the serrated edge to thus form a corrugated fracturable score line in the plastic sheet material. The apparatus is useful for forming score lines in lids for drink cups intended for fast food service.

6 Claims, 4 Drawing Sheets

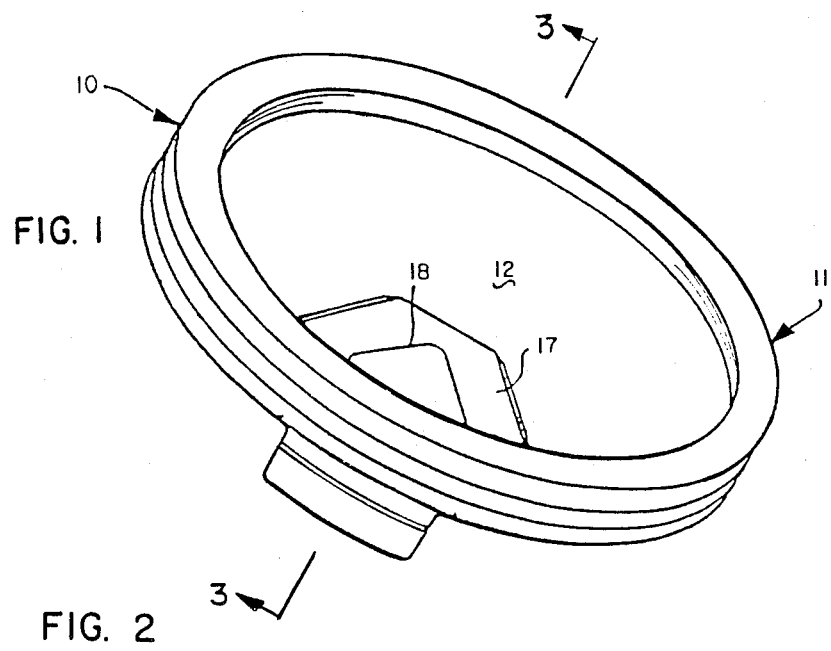
FIG. 1
FIG. 2
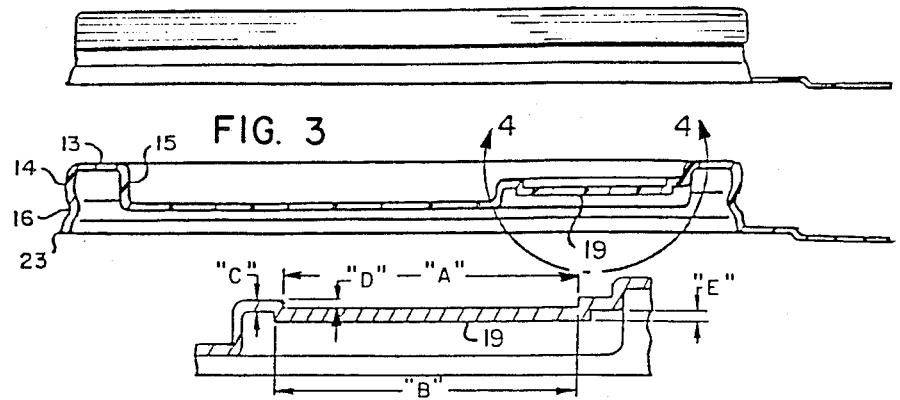
FIG. 3
FIG. 4
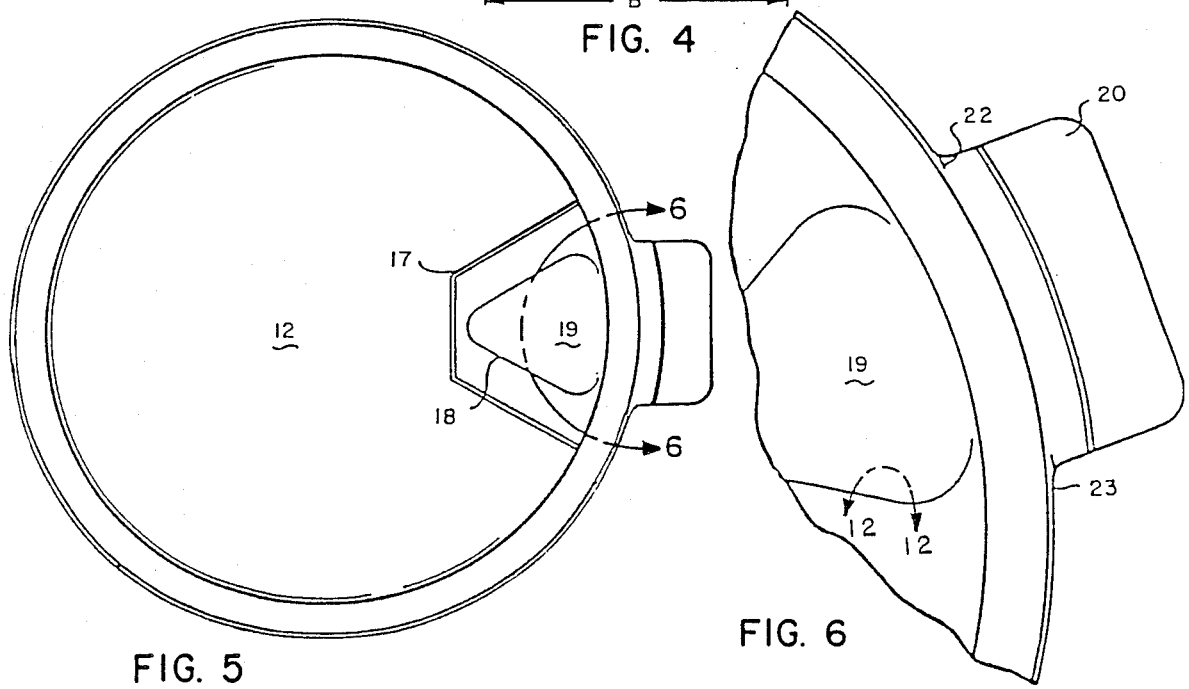
FIG. 5
FIG. 6

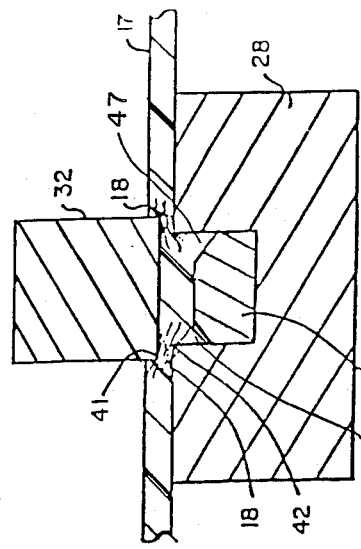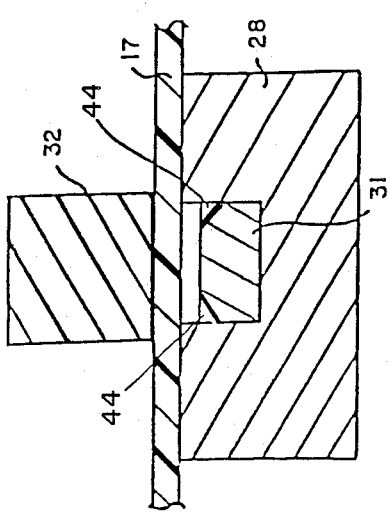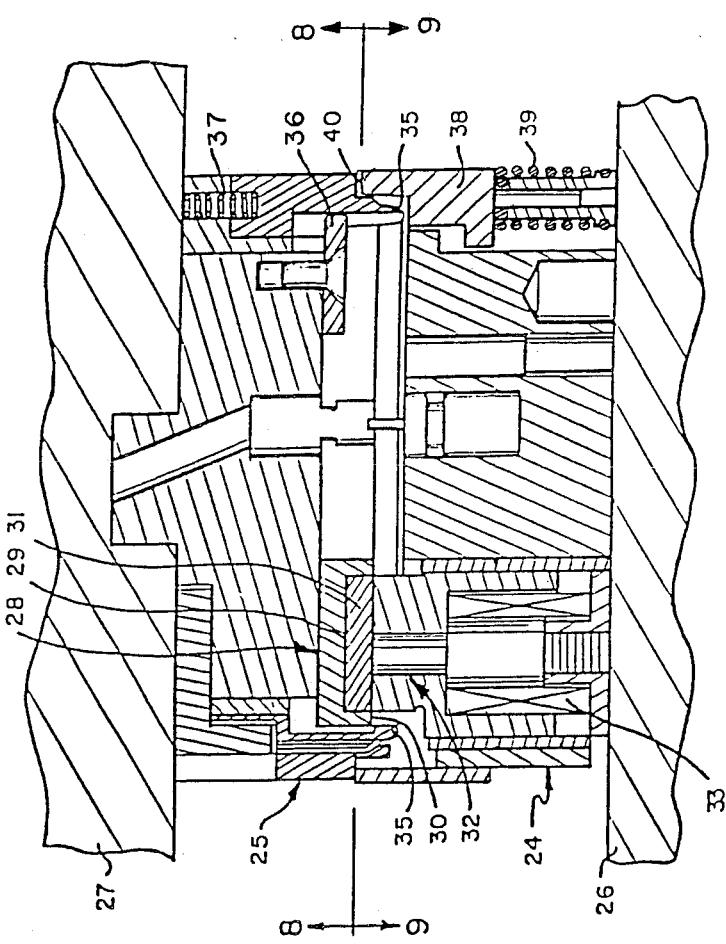

APPARATUS FOR SCORING RIGID PLASTIC SHEET MATERIAL

BACKGROUND OF THE INVENTION

This application is a division of co-pending application Ser. No. 895,206, filed Aug. 11, 1986, now U.S. Pat. No. 4,818,461, which was a continuation-in-part of application Ser. No. 774,225, filed Sept. 9, 1985 now abandoned.

Beverage service in fast food restaurants, concession stands and other locations where beverages are dispensed, commonly utilizes containers having lids formed of thin plastic material. It is desirable to have a means for opening a portion of such lids so that the beverage can be consumed from the container while at the same time a major portion of the lid remains intact on the container to prevent spillage. Prior art lids of this type have included segments defined by predetermined score lines which were intended to rupture so that the segment could be removed. It has been found that in conventional methods for scoring sheet materials, whether the scored segments be removable or simply bendable, that there are problems in forming the score lines due to destruction of tooling by reason of misalignment of parts or by reason of tears or openings at the score line caused by excessive penetration of the tooling. The later problem has resulted in leaks when the material scored was a lid for a liquid containing cup. A further problem has been found in that sometimes conventional scoring techniques stretch the plastic material and produce so-called "oil can" effects evidenced by unsightly bulges either inwardly or outwardly adjacent the score lines.

A further problem has been the inability of the score lines to reliably provide a path to which the tear line will be contained when removing a segment.

It has been found in accordance with the techniques of this invention that the foregoing problems in the prior art are overcome.

SUMMARY

According to this invention, there is provided an article made of plastic having frangible score lines. Such article can be a lid for a plastic food container in a preferred embodiment. The article is formed of a sheet of plastic material having substantially constant thickness with score lines defining an offset portion thereof which is connected to the remaining sheet material by a segment that is thinner than said sheet material and being rupturable for the removal of said offset portion. The periphery of the inwardly directed portion of said offset portion overlaps the periphery of the outwardly directed portion of the offset portion on the opposite side of said sheet material. In a feature of the invention, the offset portion is defined by substantially right angled indentations in said sheet material. According to an improved feature of the invention, there is provided a frangible plastic article formed of a sheet of rigid plastic material that has substantially constant thickness between first and second sides. The article, while in a preferred form may be a lid for a beverage container, includes a removable portion bounded at least in part by fracturable score lines extending into the material from the first side thereof. The fracturable score lines are corrugated along their length by a plurality of successive grooves and ridges with the grooves extending deeper into the material than the ridges.

According to the method aspect of the invention, there is provided a method of forming frangible score lines in a rigid plastic sheet material including the steps of placing said sheet material over a female die member and applying force to said sheet material on the opposite side of said female die by means of a punch member having edges slightly overlapping the edges of the female die member whereby score lines are formed as described above.

According to the apparatus aspects of the invention, there is provided an apparatus for forming frangible score lines in rigid plastic sheet material which includes a female die member, a punch member having edges slightly overlapping the edges of said female die member, and means to force said punch member and said female die member together to form score lines in said sheet material.

According to the improvement in the method and apparatus aspects of the invention, there has been provided a technique of forming frangible score lines in rigid plastic material which requires the means of a flat surface over which the sheet material is placed following which the material is struck on the opposite side of said flat surface by a scoring means. Associated with said flat surface is a serrated edge to form a score line whereby the points of the serrated edge extend into the sheet material a distance further than the notches of the serrated edge to form a fracturable score line with corrugations running along its length having, respectively, grooves corresponding to the points, and ridges corresponding to the notches of the serrated edge.

It was an object of this invention to provide a rigid plastic sheet material with score lines that are frangible, that will not leak fluids and which can be used to define a removable portion of the sheet material.

It was a further object of this invention to provide an apparatus for forming a plastic article with score lines wherein the apparatus could be reliably operated without danger of seriously damaging the tooling due to misalignment of parts.

A further object of this invention was to eliminate the stretching of plastic material and resulting "oil can" effects when forming score lines.

These and further objects of this invention will be apparent from the following detailed description of the invention which describes a method and apparatus for scoring rigid plastic sheet material and a plastic sheet product with score lines.

DESCRIPTION OF THE DRAWINGS

The invention will be more fully understood and described with reference to the drawings wherein:

FIG. 1 is a view in perspective of a preferred product, a lid, according to the invention;

FIG. 2 is a side elevation view of the lid of FIG. 1;

FIG. 3 is a view in cross-section taken on lines 3—3 of FIG. 1;

FIG. 4 is a view in enlarged cross-section taken within lines 4—4 of FIG. 3;

FIG. 5 is a top plan view of the lid of FIG. 1;

FIG. 6 is an enlarged fragmentary view taken within lines 6—6 of FIG. 5 and showing details of the invention;

FIG. 7 is a cross-sectional view of a preferred apparatus according to the invention;

FIG. 10 is a schematic view in cross-section showing the positioning of the punch and die in relationship to the plastic sheet material of the apparatus according to the invention in operable arrangement;

FIG. 11 is a view similar to FIG. 10 showing the relationship of the punch and die and sheet material in forming the offset portion according to the method of the invention;

Figure 8:
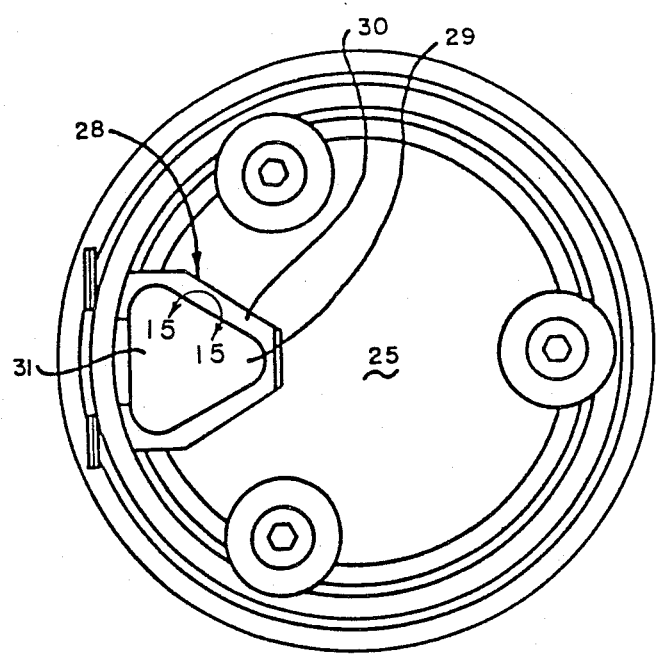
FIG. 8 is a schematic view taken looking in the direction of the arrows 8—8 on FIG. 7 showing a top plan view of the top portion of the mold apparatus shown in FIG. 7.

The drawings are not necessarily to scale.

DETAILED DESCRIPTION OF THE INVENTION

Referring now to the drawings, there is shown in FIG. 1, a lid 10 for an open topped container, which is a preferred form of the frangible plastic article formed of rigid plastic sheet material with rupturable score lines according to the invention. The lid 10 is formed of a frangible plastic material that can be torn when stress is applied and typically is formed of thin rigid plastic sheet material such as biaxially oriented polystyrene. The lid 10 comprises a perimeter 11 for engaging the edge of an open topped container and a central planar portion 12. As best shown in FIG. 3, the perimeter 11 includes an upper wall portion 13 and an outer wall portion 14. In a preferred form of the invention, there is also included an inner wall portion 15 to form a downwardly directed U-shaped groove. Outer wall portion 14 can have an inwardly extending groove 16 which serves to firmly secure the lid to an open topped container that may or may not have a corresponding bead portion.

In a preferred form of the lid 10, central planar portion 12 includes an elevated portion 17.

Score lines 18 are present on the elevated portion 17 extending from an arc radially outwardly toward the perimeter 11 to inwardly directed terminus points. The score lines 18 define a removable sector 19 which can be separated from the lid 10 as hereinafter described.

Extending outwardly from outer wall 14 is a finger movable tab 20. The tab permits upward pressure to be applied to perimeter 11 in the proximate area of the sector 19. While an outwardly extending tab 20 is shown, any tab sufficient to permit finger movement to apply upward pressure will suffice.

In accordance with co-pending application Ser. No. 717,030, filed Mar. 28, 1985, by one of the co-inventors herein, and incorporated herein by reference, a pair of second score lines 22 and 23 can be provided in the outer wall portion 14. These score lines extend circumferentially from the lower edge 23 of the outer wall portion and are angled inwardly from such lower edge to define tear points adjacent the side of the tear tab 20 to initiate rupture of the lid material upon upward movement of the tab. The tab 20 is finger movable to permit upward pressure to be applied whereby rupture of said frangible material will be initiated at the second score lines 22 and 23 and will continue through the unscored material of the perimeter portion to the inwardly directed portions of score lines 18 which will then rupture to free the sector 19 from the remainder of the lid 10. It will be understood that the foregoing described sector removal operation can be accomplished while the lid 10 is installed on a suitable container without removing the lid.

As shown in FIG. 5, said sector 19 is joined at score lines 18 to the material of elevated portion 17. The material of sector 19 is offset from the remaining material of elevated portion 17 by being indented on the upper surface and extending downwardly on the lower surfaces. In a preferred form of the invention the segment of sheet material that forms score lines 18 is thinner than the sheet material of said elevated portion 17 and said sector portion 19. Said segment of material at said score lines 18 is also partially fractured to provide ease of rupturing. By the term "partially fractured", it is meant that some of the material of the segment forming said score lines has been transversely sheared to provide a weakened segment. Such material is weakened by shearing forces occasioned in a preferred manufacturing process as will be hereinafter described. The periphery of the upper or indented portion of sector 19 as designed by dimension "A" in FIG. 4 overlaps the periphery of the outwardly directed offset portion with such periphery of the outwardly directed offset portion being designated by dimension "B". Thus, the upper indented inwardly directed periphery slightly overlaps the lower outwardly directed periphery. While the degree of overlap may be slight, it provides an important feature of this invention in that the lid of the preferred form of the invention can be readily manufactured with partially fractured, or thinned and weakened, score lines as will be hereinafter pointed out. It is presently preferred that the overlap as defined by dimension "A" minus dimension "B" be no greater than about 1.13 times the sheet thickness nor less than about 1.04 times said sheet thickness with the sheet thickness being designated by dimension "C" on FIG. 4. In a preferred form of the invention, the depth of the indented portion of the offset as designated by dimension "D" in FIG. 4 is approximately about 30 to about 40 percent of the thickness of said sheet material as designated by dimension "C". Likewise, the depth of the outwardly directed offset portion as designated by dimension "E" is about 30 to about 40 percent of the thickness of said sheet material as designated by dimension "C".

A typical sheet thickness "C" might be 0.011 to 0.012 with the depths of the inwardly directed portion of the offset designated as "D" and "E" respectively being each about 0.005 inches.

Figure 9:
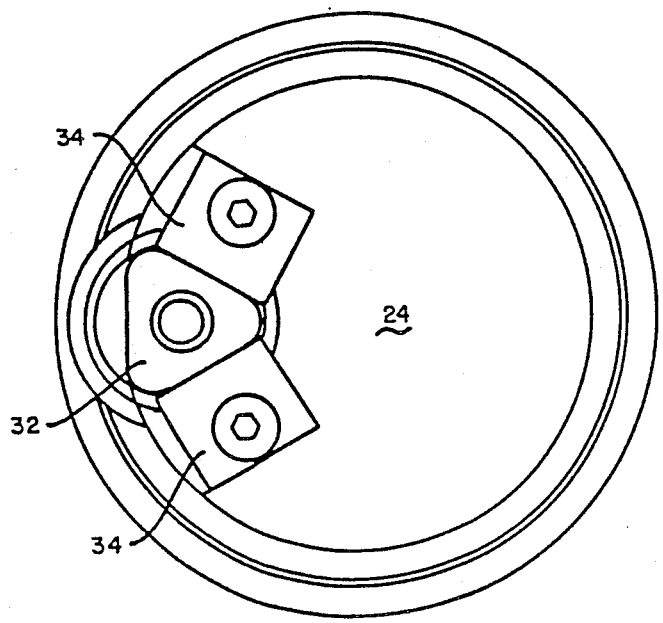
FIG. 9 is a schematic view taken looking in the direction of the arrows 9—9 of FIG. 7 showing a top plan view of the bottom portion of the mold apparatus shown in FIG. 7.

Referring now to FIGS. 7, 8 and 9, there is shown therein an apparatus for forming frangible score lines in plastic sheet material according to the invention in a preferred form. The apparatus comprises two mold halves 24 and 25 respectively which are mounted on movable platens 26 and 27. Mold half 25 includes a female die member 28 which includes a cavity 29 and die face 30. At the bottom of cavity 29 is a removable pad 31 which can be of varying thickness to accommodate varying thicknesses of sheet materials contacted by the die. Mold half 24 includes a movable punch 32 which is spring loaded by spring 33 and is positioned by mounting plates 34. Mold half 25 includes a pilot 35 which is adapted to fit into a preformed groove of a lid such as that shown as the U-shaped groove formed by elements 13, 14 and 15 in FIG. 3.

Mold half 25 is further provided with tab retainers 36 and loading springs 37 to provide for movement of pilot 35. On mold half 24 clamping means 38 are loaded by springs 39 for movement against the shoulder 40 of pilot 35.

Figure 15:
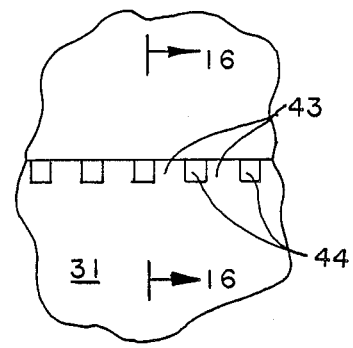
FIG. 15 is an enlarged fragmentary view taken within line 15—15 of FIG. 8.
Figure 16:
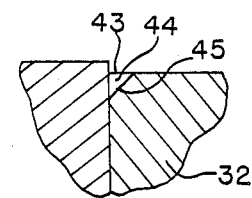
FIG. 16 is a view in cross-section taken on line 16—16 of FIG. 15.

In the preferred form of an improvement according to the invention, as shown in FIG. 15 and 16, the edge of pad 31 is serrated to provide a plurality of points 43 and notches 44 said points 43 and notches 44 being at right angles to each other. As shown in FIG. 16, a preferred form of notch 44 is provided by a diagonal cut 45 across the edge of pad 31 extending from the face to the side thereof and running at an angle of approximately 45°. The depth of notch 44 from the point of the edge in either the face or side direction can be from about 1/32 inch to about ⅛ inch. The width of the notch can vary, however notches having widths of about 0.010 inch to about 0.040 inch have been found to produce a satisfactory product.

In operation, the apparatus shown in FIGS. 7, 8 and 9 performs as follows:

A lid of the type shown in FIG. 1 which has had all of the elements thereof pre-formed, except for score lines 18, is placed between mold halves 24 and 25 which have been moved apart by relative movement of platens 26 and 27. The lid is indexed with the outwardly directed U-shaped groove formed by walls 13, 14 and 15 fitting over pilot 35. The mold halves 24 and 25 are then moved together by the relative movement of platens 26 and 27 toward each other and the lid is securely fastened between pilot 35 and clamping means 38 which are forced towards each other by the force of loading spring 37 and spring 39 respectively. As mold halves 24 and 25 move together, spring 33 forces punch 32 into the material of lid 10 and forces such material into die 28 in a manner shown schematically in FIGS. 10 and 11. In a preferred form of the invention, the female die depth is less than the thickness of the sheet material and the sheet material is forced to the bottom of the female die 28 by punch 32. The depth of female die 28 can be controlled by the thickness of pad 31 which can be varied and depends upon the thickness of the material to be scored in the die. In a preferred form, the punch 32 overlaps the edges of cavity 29 by a distance of about 0.003 to about 0.0055 inches. This overlap results in an advantage in that the inadvertent misalignment of the upper and lower mold halves 24 and 25 will not result in damage to the mold.

Figure 12:
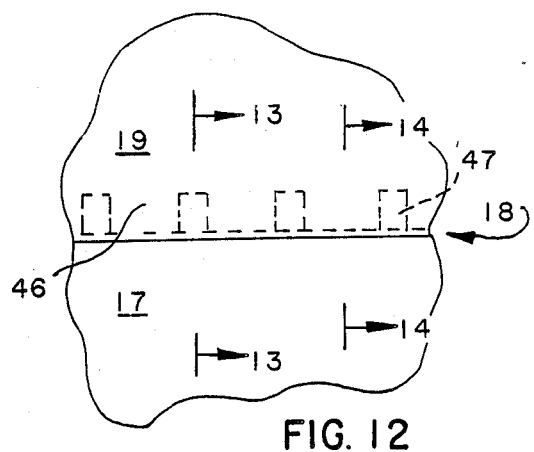
FIG. 12 is an enlarged fragmentary view taken within line 12—12 of FIG. 6.
Figure 13:
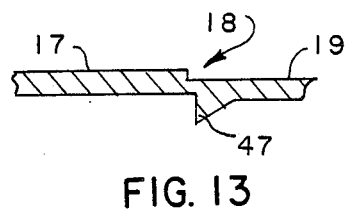
FIG. 13 is a view in cross-section taken on line 13—13 of FIG. 12.
Figure 14:
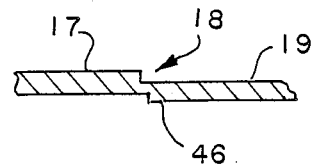
FIG. 14 is a view in cross-section taken on line 14—14 of FIG. 12.

As shown in FIG. 11, the punch 32 contacts the upper surface of the sheet material of the elevated portion 17 of lid 10 such that the segment of the material of the score lines is partially fractured. In the preferred form of the invention the corners 41 and 42 of the punch and die respectively are generally square to form corresponding corners in the indented upper surface and the downwardly extending portion of the offset sheet material. Due to the serrated edge of pad 31 associated with the female die 28' the points 43 of such serrated edge extend into the sheet material of lid 10 a distance further than notches 44. The result is a fracturable score line 18 that extends into the material of lid 10 and is corrugated along its length thereof by a plurality of successive grooves 46 and ridges 47 with the grooves 46, as shown in FIG. 12, FIG. 13. and FIG. 14, extending deeper into the material of lid 10 than the ridges 47. The grooves 46 and ridges 47 have substantially right angled corners.

The invention may be embodied in other specific forms without departing from the spirit or essential characteristics thereof. The present embodiments are therefore to be considered in all respects as illustrative and not restrictive, the scope of the invention being indicated by the appended claims; and all changes which come within the meaning and range of equivalency of the claims are therefore intended to be embraced therein.

What is claimed is:

1. An apparatus for forming frangible score lines in rigid plastic sheet material comprising:
   (a) a flat surface;
   (b) a scoring means having means to move said scoring means to strike downwardly on a sheet of rigid plastic material overlying said flat surface;
   (c) a serrated edge located on said flat surface, said serrated edge having points and notches; and,
   (d) means to control the distance of travel of said scoring means relative to said flat surface such that when said scoring means strikes downwardly on said sheet of rigid plastic material overlying said flat surface and said serrated edge the points of said serrated edge will extend into said sheet of rigid plastic material a distance further than the notches of said serrated edge to form a corrugated fracturable score line in said plastic sheet material.

2. An apparatus according to claim 1 wherein said notches are at substantially right angles from said flat surface.

3. An apparatus for forming frangible score lines in rigid plastic sheet material comprising:
   (a) a female die member having means to receive said rigid plastic sheet material, said female die member having a cavity and said cavity having a bottom member with serrated edges;
   (b) a punch member having means to move said punch member to a position to apply force to said rigid plastic sheet material overlying said cavity, said punch member slightly overlapping the edges of the cavity of said female die member;
   (c) means to force said punch member and said female die member together and to force said rigid plastic sheet material into said cavity of said female die member to contact the serrated edges of said bottom member; and,
   (d) means to control the distance of travel of said punch member relative to said female die member whereby corrugated score lines are formed in said sheet material by the serrated edges of said bottom member.

4. An apparatus according to claim 3 wherein said punch member overlaps the edges of the cavity of said female die by a distance of about 0.003 to about 0.0055 inches.

5. An apparatus according to claim 3 wherein the depth of the cavity of said female die member is less than the thickness of said sheet material and said sheet material is forced to the bottom of said cavity by said punch member.

6. An apparatus according to claim 5 further comprising a removable pad means as a bottom member of said female die, said removable pad means containing said serrated edge.

* * * * *